(12) United States Patent
Beeck

(10) Patent No.: US 8,690,158 B2
(45) Date of Patent: Apr. 8, 2014

(54) AXIALLY ANGLED ANNULAR SEALS

(75) Inventor: Alexander R. Beeck, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 541 days.

(21) Appl. No.: 12/832,140

(22) Filed: Jul. 8, 2010

(65) Prior Publication Data
US 2012/0007317 A1   Jan. 12, 2012

(51) Int. Cl.
*F01D 11/02*   (2006.01)
*F16J 15/00*   (2006.01)

(52) U.S. Cl.
USPC .......................................... 277/355; 277/500

(58) Field of Classification Search
USPC .................. 277/355, 412, 418, 419, 420, 500
See application file for complete search history.

(56) References Cited

U.S. PATENT DOCUMENTS

| | | | |
|---|---|---|---|
| 2,233,579 A | 3/1941 | Bowers | |
| 4,406,466 A * | 9/1983 | Geary, Jr. | 277/400 |
| 4,526,509 A | 7/1985 | Gay, Jr. et al. | |
| 4,767,266 A * | 8/1988 | Holz et al. | 415/173.5 |
| 5,031,922 A | 7/1991 | Heydrich | |
| 5,108,116 A | 4/1992 | Johnson et al. | |
| 5,135,237 A * | 8/1992 | Flower | 277/355 |
| 5,176,389 A * | 1/1993 | Noone et al. | 277/355 |
| 5,480,165 A * | 1/1996 | Flower | 277/355 |
| 5,639,095 A * | 6/1997 | Rhode | 277/303 |
| 5,755,445 A | 5/1998 | Arora | |
| 5,944,320 A * | 8/1999 | Werner et al. | 277/355 |
| 5,961,280 A | 10/1999 | Turnquist et al. | |
| 6,010,132 A * | 1/2000 | Bagepalli et al. | 277/355 |
| 6,196,550 B1 | 3/2001 | Arora et al. | |
| 6,267,381 B1 | 7/2001 | Wright | |
| 6,343,792 B1 | 2/2002 | Shinohara et al. | |
| 6,736,401 B2 | 5/2004 | Chung et al. | |
| 6,736,597 B2 | 5/2004 | Uehara et al. | |
| 6,811,154 B2 | 11/2004 | Proctor et al. | |
| 6,843,482 B1 * | 1/2005 | Bayne | 277/412 |
| 6,860,484 B2 | 3/2005 | Urlichs | |
| 6,874,788 B2 | 4/2005 | Kono | |
| 6,935,631 B2 | 8/2005 | Inoue | |
| 6,976,680 B2 | 12/2005 | Uehara et al. | |
| 7,052,015 B2 | 5/2006 | Addis | |

(Continued)

FOREIGN PATENT DOCUMENTS

EP     0391676 A1    10/1990
WO   WO 9501524 A1 *  1/1995

OTHER PUBLICATIONS

Ching-Pang Lee; U.S. patent application entitled, "Seal Including Flexible Seal Strips."

*Primary Examiner* — Kristina Fulton
*Assistant Examiner* — Lakshmi Koneru

(57) ABSTRACT

A seal member for effecting a seal preventing fluid flow in an axial direction through an annular space formed between a rotatable shaft and a stator structure. The seal member includes a plurality of flexible seal strips extending radially through the annular space and having a radially outer end supported to the stator structure and a radially inner end defining a tip portion extending widthwise in the axial direction for engaging in sliding contact with a peripheral surface of the rotatable shaft. The seal strips are mounted to the stator structure with the tip portions of the seal strips at an angle to the axial direction. Each of the tip portions are formed with a curvature in a radially extending plane between a leading edge and a trailing edge of each seal strip.

16 Claims, 5 Drawing Sheets

(56) References Cited

U.S. PATENT DOCUMENTS

| | | |
|---|---|---|
| 7,066,468 B2 | 6/2006 | Uehara et al. |
| 7,159,872 B2 | 1/2007 | Nicholson et al. |
| 7,182,345 B2 | 2/2007 | Justak |
| 7,410,173 B2 | 8/2008 | Justak |
| 7,413,194 B2 * | 8/2008 | Wright et al. ............. 277/355 |
| 7,454,822 B2 | 11/2008 | Szymbor et al. |
| 7,743,498 B2 * | 6/2010 | Rhodes ..................... 29/888.3 |
| 7,976,026 B2 * | 7/2011 | Verma et al. ............... 277/355 |
| 8,205,889 B2 * | 6/2012 | Verma et al. ............... 277/303 |
| 2002/0063391 A1 * | 5/2002 | Kono ........................ 277/355 |
| 2002/0105146 A1 | 8/2002 | Uehara et al. |
| 2002/0117806 A1 * | 8/2002 | Grondahl ................... 277/355 |
| 2003/0001339 A1 * | 1/2003 | Inoue ........................ 277/355 |
| 2003/0042682 A1 * | 3/2003 | Inoue ........................ 277/355 |
| 2003/0062686 A1 | 4/2003 | Uehara et al. |
| 2003/0085525 A1 * | 5/2003 | Boston ...................... 277/355 |
| 2004/0100030 A1 * | 5/2004 | Addis ........................ 277/355 |
| 2004/0256810 A1 | 12/2004 | Nakano et al. |
| 2005/0046113 A1 * | 3/2005 | Inoue ........................ 277/355 |
| 2005/0194745 A1 | 9/2005 | Hogg |
| 2006/0033285 A1 | 2/2006 | Nishimoto et al. |
| 2006/0208427 A1 | 9/2006 | Wright et al. |
| 2006/0210392 A1 | 9/2006 | Enderby |
| 2007/0018408 A1 | 1/2007 | Kono |
| 2007/0085277 A1 * | 4/2007 | Rhodes et al. ............. 277/355 |
| 2007/0120326 A1 * | 5/2007 | Rhodes et al. ............. 277/355 |
| 2008/0007008 A1 | 1/2008 | Hoebel et al. |
| 2008/0007009 A1 * | 1/2008 | Williams ................... 277/355 |
| 2008/0007010 A1 * | 1/2008 | Williams ................... 277/355 |
| 2008/0061513 A1 * | 3/2008 | Awtar et al. ............... 277/355 |
| 2008/0099999 A1 * | 5/2008 | Williams ................... 277/355 |
| 2008/0224415 A1 * | 9/2008 | Flaherty et al. ........... 277/355 |
| 2008/0265514 A1 * | 10/2008 | Mortzheim ................ 277/303 |
| 2008/0284107 A1 * | 11/2008 | Flaherty et al. ........... 277/355 |
| 2008/0309019 A1 * | 12/2008 | Wolfe et al. ............... 277/420 |
| 2009/0072486 A1 * | 3/2009 | Datta ......................... 277/355 |
| 2009/0315272 A1 * | 12/2009 | Kasahara et al. .......... 277/355 |
| 2010/0270747 A1 * | 10/2010 | Ghasripoor et al. ....... 277/355 |
| 2010/0320697 A1 * | 12/2010 | Kono ......................... 277/355 |
| 2011/0072831 A1 * | 3/2011 | Tanimura .................... 60/805 |
| 2011/0182729 A1 * | 7/2011 | Sivakumaran et al. ..... 415/231 |
| 2011/0227289 A1 * | 9/2011 | Stefan ........................ 277/355 |
| 2012/0086172 A1 * | 4/2012 | Zheng et al. .............. 277/355 |
| 2012/0104700 A1 * | 5/2012 | Peer et al. .................. 277/355 |
| 2012/0193875 A1 * | 8/2012 | Deo et al. .................. 277/412 |

* cited by examiner

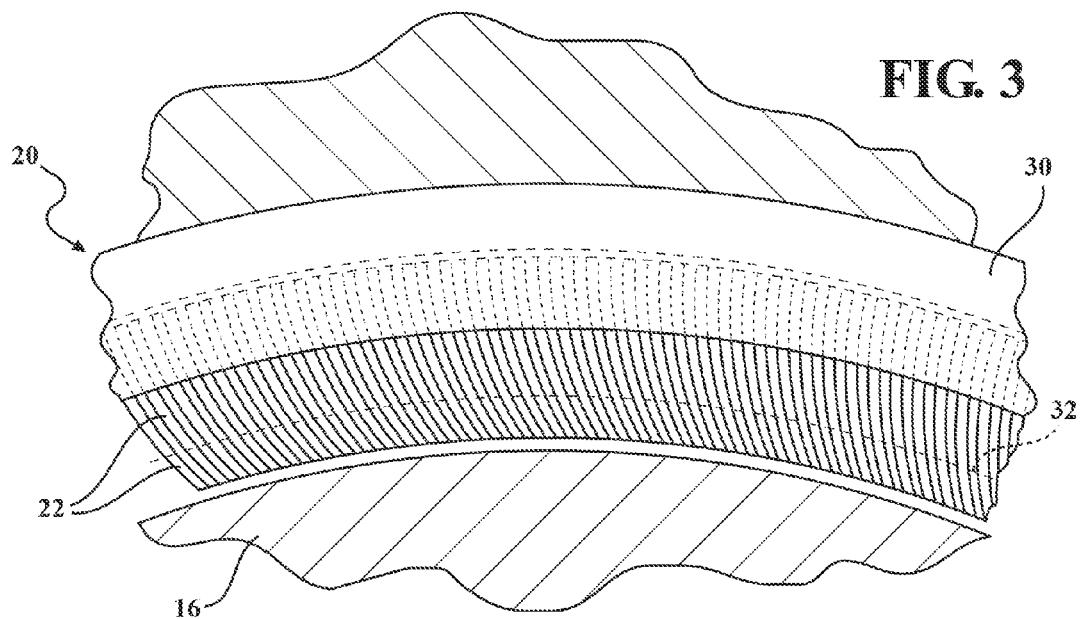
FIG. 3
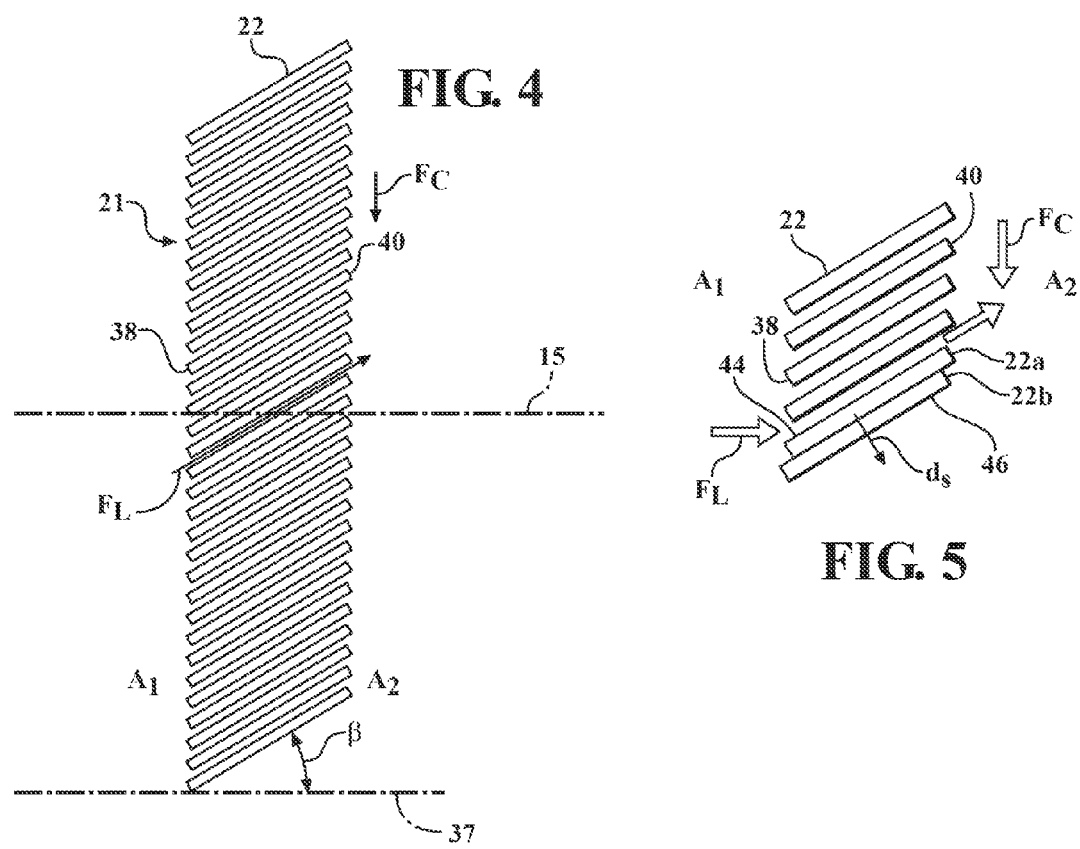
FIG. 4
FIG. 5

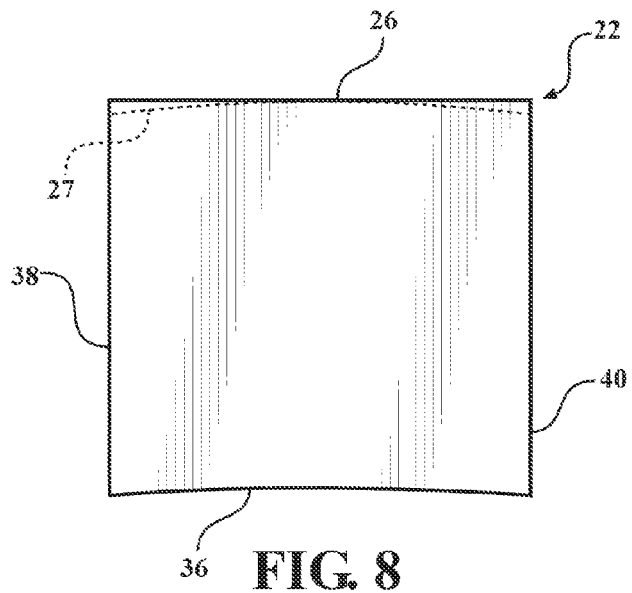
FIG. 8
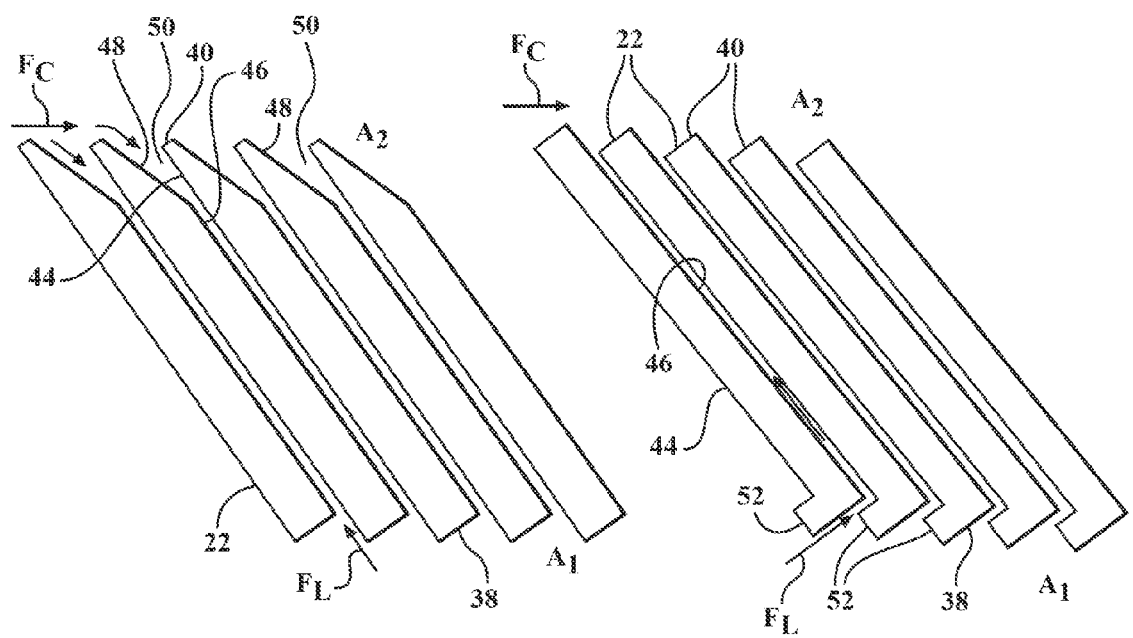
FIG. 9
FIG. 10

AXIALLY ANGLED ANNULAR SEALS

FIELD OF THE INVENTION

This invention relates to a seal between two relatively movable members and, more particularly, to a seal including a plurality of seal strips forming an annular seal between a stationary member and a rotatable member, such as a turbine shaft.

BACKGROUND OF THE INVENTION

In a gas turbine engine, there are fluid pressure variations between axially adjacent zones, such as adjacent zones through which the turbine shaft passes, with resulting leakage of fluid, e.g., air and/or other gases, between the zones. In particular, there is typically leakage at clearances between stationary and rotating parts of a turbine engine wherein a leakage flow occurs from a higher pressure zone to a lower pressure zone across the clearance between the rotating part and the stationary part. In order to improve the thermodynamic efficiency of the engine, the leakage flow needs to reduced or minimized, such as by means of a seal provided in the annular space between the two relatively moving parts.

A seal for limiting leakage across the annular space may comprise a leaf seal. Leaf seals generally comprise a plurality of seal strips mounted to a carrier member and packed closely together in the circumferential direction. The flexible strips may bend in the circumferential direction, but exhibit a high resistance to bending in the axial direction, ensuring that the flexible strips will continue to be positioned closely adjacent to the rotating shaft even in the presence of high pressure differentials between the axially adjacent zones.

SUMMARY OF THE INVENTION

In accordance with an aspect of the invention, a seal member is provided for effecting a seal preventing fluid flow in an axial direction through an annular space formed between a rotatable shaft and a stator structure defining two relatively moving components. The seal member may comprise a plurality of flexible seal strips, each seal strip comprising a planar plate extending radially through the annular space and having a radially outer end supported to the stator structure and a radially inner end comprising a tip portion extending widthwise in the axial direction for engaging in sliding contact with a peripheral surface of the rotatable shaft. The seal strips are mounted to the stator structure with the tip portions of the seal strips at an angle to the axial direction. Each of the tip portions are formed with a curvature in a radially extending plane between a leading edge and a trailing edge of each seal strip.

In accordance with another aspect of the invention, a seal member is provided for effecting a seal preventing fluid flow in an axial direction through an annular space formed between a rotatable shaft and a stator structure defining two relatively moving components. The seal member may comprise a plurality of flexible seal strips, each seal strip comprising a planar plate extending radially through the annular space and having a radially outer end supported to the stator structure and a radially inner end comprising a tip portion extending widthwise in the axial direction for engaging in sliding contact with a peripheral surface of the rotatable shaft. Each of the seal strips comprises a leading edge and a trailing edge. The seal strips are mounted to the stator structure with the tip portions of the seal strips at an angle to the axial direction. The seal strips are arranged in a plurality of axially adjacent rows. The seal strips of at least one of the rows being angled in the axial direction with the leading edge being located aft of the trailing edge with reference to a rotation direction of the rotatable shaft, and the seal strips of another of the rows being angled in an opposite direction with the trailing edge being located aft of the leading edge.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 3 is a cross-sectional view of the seal member taken along line 3-3 in FIG. 2;

FIG. 4 is a view of an outer end of a seal including a plurality of seal strips oriented at an axial angle;

FIG. 5 illustrates a sealing effect of the seal of FIG. 4;

FIG. 8 is a plan view of a seal strip in accordance with the present invention;

FIG. 9 illustrates an embodiment for an additional flow inhibiting feature for the seal;

FIG. 10 illustrates another embodiment of an additional flow inhibiting feature for the seal.

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
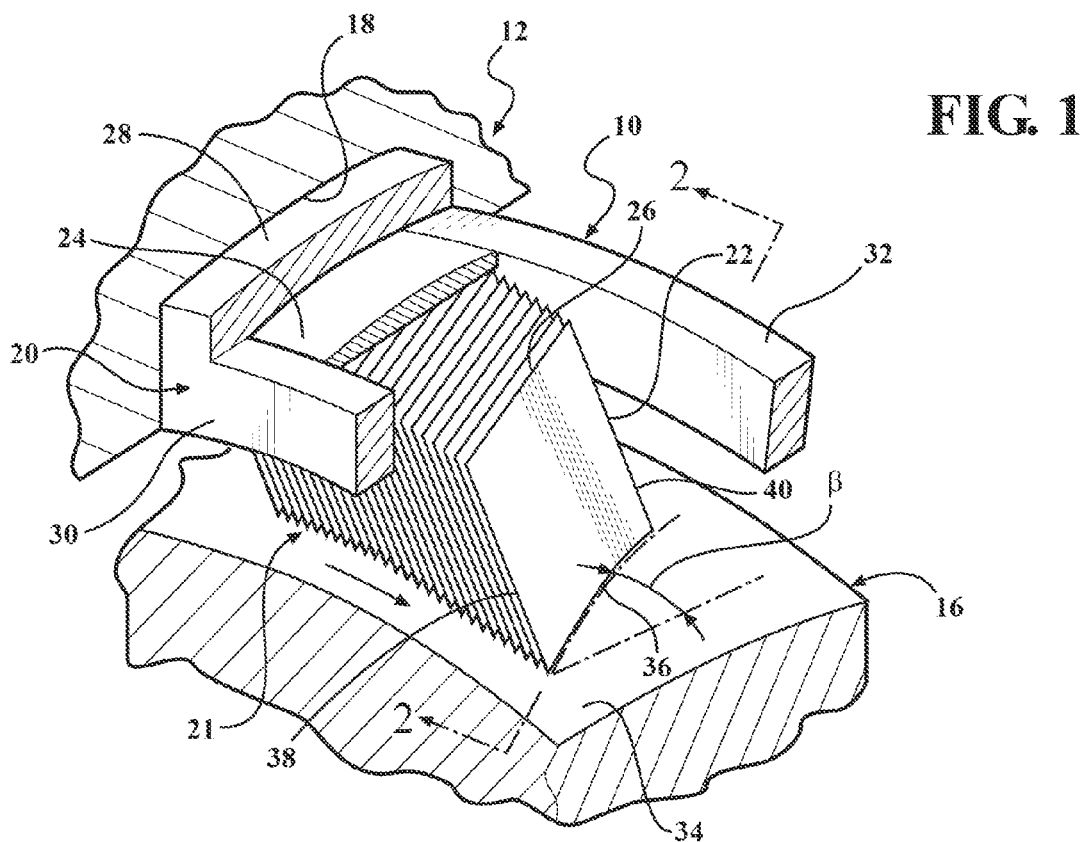
FIG. 1 is a cross-sectional perspective view illustrating a seal member in accordance with an embodiment of the present invention.
Figure 2:
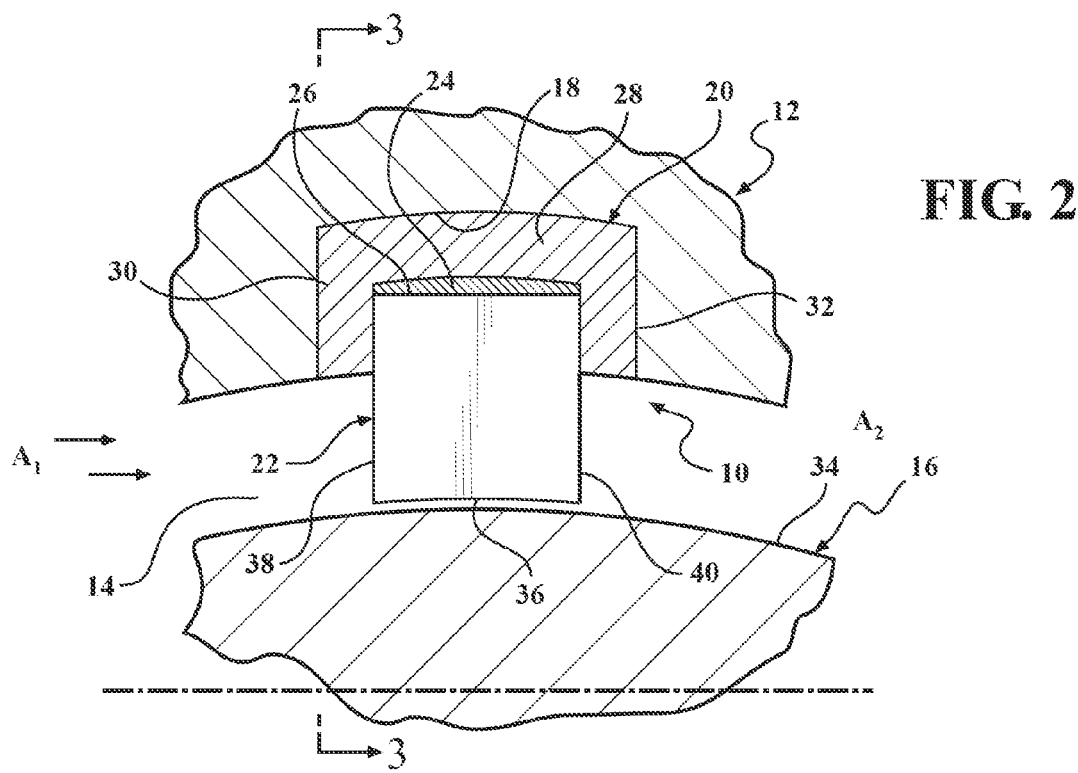
FIG. 2 is cross-sectional view of the seal member taken along line 2-2 in FIG. 1.

Referring to FIGS. 1-3, an embodiment of the invention is illustrated. FIGS. 1 and 2 show a seal member 10 comprising a leaf seal mounted in a housing 12 of a gas turbine engine in order to separate a high-pressure zone or region $A_1$ from a low-pressure zone or region $A_2$ within a chamber or annular space 14 (FIG. 2) located between the housing 12 and a shaft 16.

The shaft 16 extends through a bore of the housing 12 with a clearance gap therebetween. The shaft 16 and the housing 12 are subject to relative movement, where the shaft 16 is intended to rotate at relatively high rotational rates, such as is typically found in gas turbine engines. The housing 12 may comprise an annular groove 18, and the seal member 10 is received and mounted within the annular groove 18. In particular, the seal member 10 comprises a stator structure or carrier 20 supporting an annular seal 21 comprising a plurality of leaves or seal strips 22. For example, the seal strips 22 may be attached to the carrier 20 at a braze or weld connection 24 formed at a radially outer end 26 of the seal strips 22. The carrier 20 may include a backing plate 28, a high-pressure side end plate 30 adjacent to a leading edge 38 of the seal strips 22, and a low-pressure side end plate 32 adjacent to a trailing edge 40 of the seal strips 22. The end plates 30, 32 extend radially inwardly, i.e., toward the shaft 16, from the backing plate 28 and may be formed integrally with the backing plate 28 or may be attached as separate elements to the backing plate 28. The carrier 20 provides a mounting structure that fits within the groove 18 of the casing 12 to substantially rigidly support the plurality of seal strips 22 such that a radially inner end or tip portion 36 of the seal strips 22 is positioned in close proximity to a peripheral surface 34 of the shaft 16. It should be noted that during operation of the turbine, the inner ends 36 of the seal strips 22 are generally positioned out of contact with the shaft 16, as is seen in FIGS. 2-3. However, the inner ends 36 may rest in engagement with the shaft 16 with a predetermined biasing force when the turbine is not operating. Further, it should be understood that, within the spirit and scope of the invention, other stator structures may be provided for substantially rigidly supporting the seal strips 22 in engagement with the shaft 16.

The seal strips 22 comprise relatively thin planar plate members formed of a metallic material, such as stainless steel or Haynes 25, and also may comprise a non-metallic material such as aramid. The seal strips 22 are formed with a significantly greater axial width dimension than the thickness of the seal strips 22. An exemplary seal strip 22 for use in the present invention may have the following dimensions: a radial length of about 5 mm to about 40 mm, an axial width of about 5 mm to about 30 mm, and a thickness in the circumferential direction of about 0.05 mm to about 1 mm. The described materials and dimensions are provided as an exemplary description of the invention, and other materials and dimensions may be incorporated within the scope of the invention.

Referring to FIG. 3, the seal strips 22 are closely arranged adjacent to each other, substantially minimizing the leaf-to-leaf spacing between adjacent seal strips 22 to minimize axial flow through the seal member 10 between the high-pressure region $A_1$ and adjacent low-pressure region $A_2$. Further, the seal strips 22 comprise flexible elements, having a relatively high degree of flexibility in the circumferential direction and having a relatively high rigidity in the axial direction of the shaft 16. It may be noted that the length of the seal strips 22 is preferably greater than a radial distance between an inner surface 42 of the backing plate 28 of the carrier 20 and the peripheral surface 34 of the shaft 16. The seal strips 22 are angled from their attachment to the backing plate 28 at the radially outer end 26 in the direction of rotation of the shaft 16 to form a radial angle between the peripheral surface 34 and the plane of the seal strips 22 at the radially inner end 36. The radial angle may be selected, along with the length of the seal strips 22, to provide a predetermined pre-load pressure between the radially inner end 36 of the seal strips 22 and the peripheral surface 34 of the shaft 16.

As seen in FIGS. 1 and 4, the seal strips 22 are oriented at an angle to the axial direction, i.e. relative to an axis of rotation 15 of the shaft 16, as is illustrated by an angle β of the tip portion 36 relative to a line 37 parallel to the axis of rotation 15 of the shaft 16. Specifically, in the present embodiment, the seal strips 22 are angled in the axial direction with the leading edge 38 located aft of the trailing edge 40 with reference to the direction of rotation of the shaft 16. It is believed that orienting the seal strips 22 at the angle β may increase the sealing effect of the seal member 10 by effecting a further restriction to leakage flow $F_L$ between adjacent strips 22. In particular, the angled seal strips 22 are formed with a greater axial width than a distance between the high-pressure side end plate 30 and the low-pressure side end plate 32, in a direction parallel to the axis of rotation 15 of the shaft 16, thereby increasing the length of the leakage flow path and increasing the resistance to leakage flow $F_L$ along the leakage flow path defined between adjacent seal strips 22.

The leakage flow $F_L$ is further reduced by a hydrodynamic pressure related to a cavity flow $F_C$ produced by friction between the shaft surface 34 and the air in the cavity adjacent to the seal 21 due to rotation of the shaft 16. The cavity flow $F_C$ has a component in the direction of rotation of the shaft 16, and may operate to increase the dynamic head in the low pressure area $A_2$. That is, the cavity flow $F_C$ produced in the low pressure area $A_2$ by the rotation of the shaft 16 tends to flow into the spaces between the adjacent seal strips 22 at the trailing edges 40 of the seal strips 22, creating an increased back pressure for counteracting leakage flow $F_L$ entering at the leading edges 38 of the seal strips 22.

In addition, in the embodiment shown in FIG. 4, the cavity flow $F_C$ will tend to act against a forward face 44 of the seal strips 44, and will be turned or deflected to flow generally parallel to the seal strips 22. The force required to deflect the direction of the cavity flow $F_C$ comprises a circumferentially directed force that tends to bias and move the seal strips 22 circumferentially into engagement with each other, as is depicted in FIG. 5 by movement in the direction, $d_s$, of a seal strip 22a into engagement with an adjacent seal strip 22b. The movement of the seal strips 22 toward each other may further increase the sealing between adjacent seal strips 22 to reduce the leakage flow $F_L$.

Figure 6:
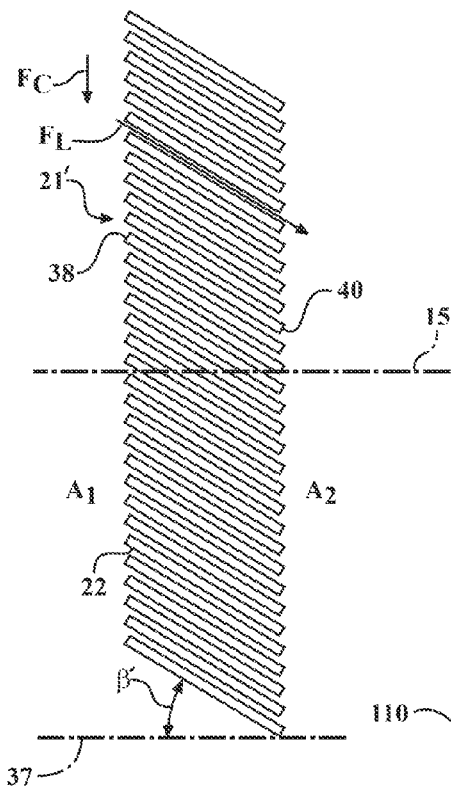
FIG. 6 is a view of an outer end of a seal including a plurality of seal strips at an axial angle opposite to that illustrated in FIG. 4.

Referring to FIG. 6, a further seal 21' comprising an alternative orientation of the seal strips 22 is illustrated, where the seal strips 22 of the seal 21' are angled relative to the rotational axis 15 of the shaft 16 at an axial angle opposite to that of the seal plates 22 of the seal 21, as depicted by an angle β' relative to the line 37 parallel to the rotational axis 15 of the shaft 16. The seal strips of the seal 21' are angled in the axial direction with the trailing edge 40 located aft of the leading edge 38 with reference to the direction of rotation of the shaft 16. It is believed that the orientation of the seal strips 22 in the seal 21' permit the cavity flow $F_C$ to enter the seal 21' at the leading edges 38 between the seal strips 22, where the leakage flow $F_L$ may accelerate the cavity flow $F_C$. The acceleration of the cavity flow $F_C$ as it passes between the seal strips 22 may increase a hydrodynamic pressure on the forward face 44 of the seal strips 22 to facilitate lifting the seal strips 22 radially away from the surface 34 of the shaft 16, reducing friction at the shaft 16.

Figure 7:
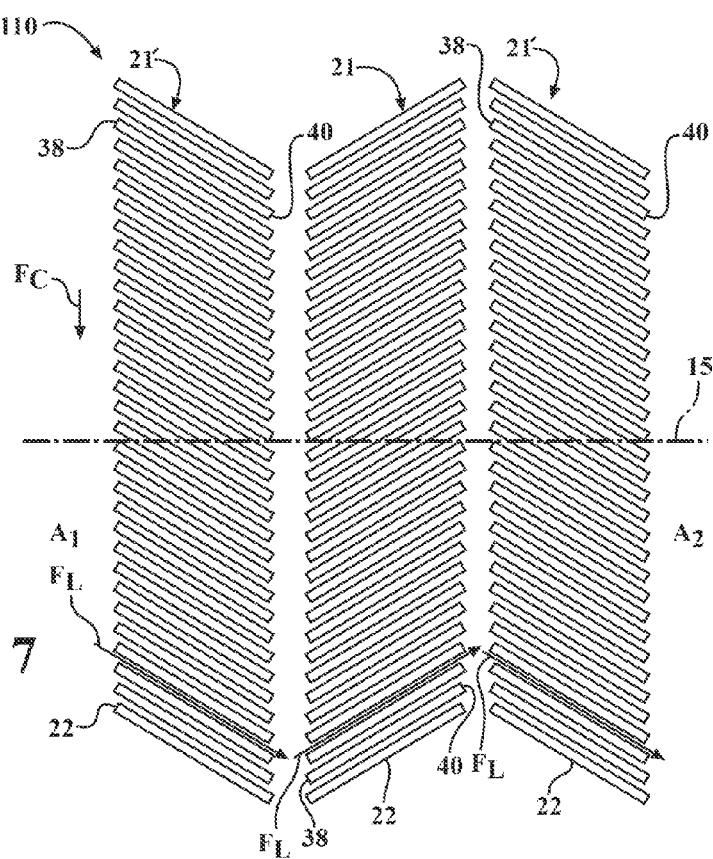
FIG. 7 is a view of an outer end of an alternative arrangement of a seal member including a combination of the seals of FIGS. 4 and 6.

Referring to FIG. 7, an alternative arrangement for the seals is illustrated in which a seal member 110 may comprise a plurality of the seals 21, 21'. In particular, the seal strips 22 of the seals 21, 21' are arranged in axially adjacent rows with the orientation, i.e., the angle relative to the axial direction, of each row of seal strips 22 alternating relative to the orientation of seal strips 22 of immediately adjacent rows of the seal strips 22. The alternating arrangement of the seals 21, 21' may be provided to obtain the advantages of the respective seals 21, 21', as described above. The particular combination of the seals 21, 21' may vary from the configuration shown herein. For example, a seal member may be configured with the seal 21, located as a first row of seal strips 22, followed by seal strips 22 oriented as shown for the seal 21'. Further, any number of the rows of seal strips 22 arranged as shown for the seals 21 and 21' may be provided in a seal member.

Referring to FIG. 8, the seal members 22 are preferably configured with the inner edge tip portion 36 formed with a curvature in a radially extending plane, i.e., a plane defined by either the forward face 44 or a rearward face 46 (FIG. 5) of the seal strips 22, extending between a leading edge 38 and a trailing edge 40 of the seal strips 22. The curvature of the inner edge tip portion 36 is configured to match the curvature of the shaft 16 along the portion of the shaft 16 where the tip portion 36 contacts the surface 34 of the shaft 16, and comprises an elliptical shape, i.e., a section of an ellipse. The elliptical shape of the tip portion 36 provides a substantially uniform engagement or spacing between the tip portion 36 and the surface 34 of the shaft 16, effecting a substantially uniform sealing between the tip portion 36 and the shaft 16 across the width of the seal strip 22. The curvature of the tip portion 36 may be greater or lesser than that shown, depending on the angle β of the tip portion 36 relative to the rotational axis 15 of the shaft 16.

Further, the outer edge 26 of the seal strip 22 may include a curvature, depicted by the dotted line 27 in FIG. 8, generally parallel to the tip portion of the inner edge 36. Although not necessary for the present invention, the outer edge 26 may be formed as an elliptical curved edge to match a curvature of the carrier 20 adjacent to the outer edge 36 at the connection 24.

Referring to FIG. 9, the seal strips 22 may include additional flow inhibiting features, inhibiting leakage flow $F_L$ between the adjacent seal strips 22. In particular, the rearward face 46 of the seal strip 22 may be formed with a flow inhibiting feature at the trailing edge 40 comprising a tapered portion 48. The tapered portion 48 cooperates with the forward face 44 of an adjacent seal strip 22 to define a diffuser section 50 that facilitates passage of the cavity flow $F_C$ into the gaps between the adjacent seal strips 22 to increase the back pressure between the seal strips 22. The increased back pressure inhibits and reduces the leakage flow $F_L$ in the direction from the leading edge 38 toward the trailing edge 40 of the seal strips 22.

Referring to FIG. 10, another flow inhibiting feature is illustrated and comprises one of the leading and trailing edges 38, 40 of the seal strips 22 comprising a turned portion 52 to form an angle transverse to the forward and rearward faces 44, 46 of the seal strips 22. As shown in FIG. 10, the turned portion 52 comprises the leading edge 38 turned at a substantially perpendicular angle extending away from the rearward face 46, i.e., directed generally facing toward the cavity flow $F_C$. The turned portions 52 require the leakage flow $F_L$ to turn as it passes into the spaces between the seal strips 22, producing pressure losses in the flow field of the leakage flow $F_L$ and thereby reducing the leakage flow $F_L$. The turned portions 52 may be provided at either or both the leading edge 38 and/or the trailing edge 40 to increase the flow losses in the leakage flow $F_L$ at either or both edges of the seal strips 22.

Figure 11:
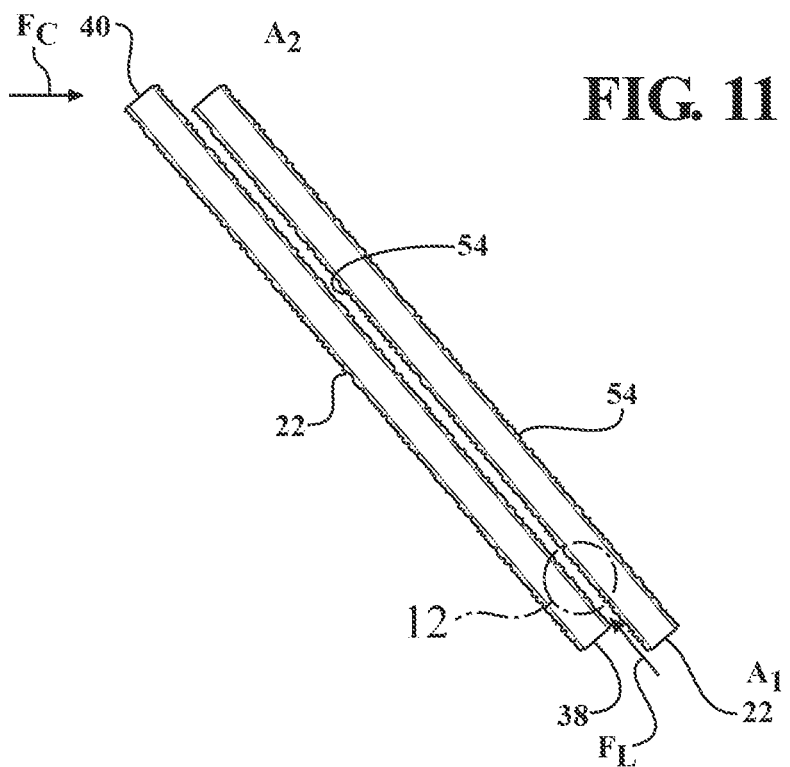
FIGS. 11 and 12 illustrate a further embodiment of an additional flow inhibiting feature for the seal.
Figure 12:
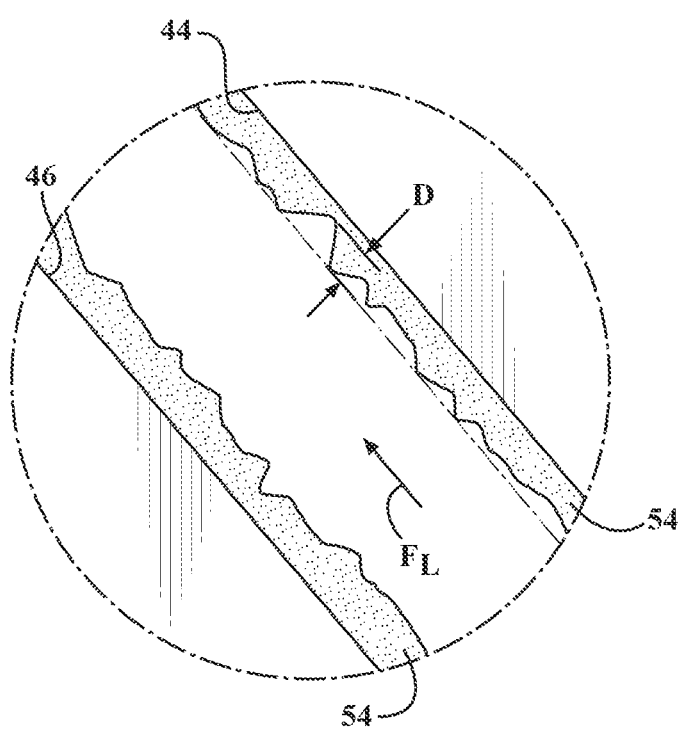

Referring to FIGS. 11 and 12, a further flow inhibiting feature comprises a rough surface coating 54 that may be applied to one or both of the forward and rearward facing surfaces 44, 46. A surface roughness of the surface coating 54 effects flow pressure losses in the leakage flow $F_L$ between the adjacent seal strips 22 to reduce the leakage flow $F_L$. The surface roughness may comprise a depth D of surface features 56 formed by discrete variations in the depth of the surface coating 54. For example, the depth D of the surface features 56 in the surface coating 54 may be in a range from about 5 μm to about 50 μm. The surface coating 54 may comprise a metallic coating applied to the forward and rearward faces 44, 46 of the seal strips 22. Alternatively, for lower temperature applications, i.e., applications in which the seal strips 22 operate near ambient air temperatures, the surface coating 54 may comprise a plastic coating material applied to the forward and rearward faces 44, 46 to form a surface roughness on the seal strips 22.

It should be understood that any one or combination of the flow inhibiting features described in FIGS. 9-12 may be incorporated into any of the seals 21 or 21' described above.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A seal assembly in a turbine engine having a housing and a rotatable shaft extending through the housing, the seal assembly being provided for effecting a seal preventing fluid flow in an axial direction through an annular space formed between the housing and the rotatable shaft, the axial direction extending parallel to a rotation axis about which said rotatable shaft rotates, the seal assembly comprising:
a stator structure supported on the housing of the turbine engine;
a plurality of flexible seal strips, each said seal strip comprising a planar plate having forward and rearward planar faces extending radially through the annular space and having a radially outer end supported to said stator structure and a radially inner end comprising a tip portion extending widthwise in the axial direction for engaging in sliding contact with a peripheral surface of said rotatable shaft, wherein a thickness of each said seal strip extends in the circumferential direction between said forward and rearward faces, and each said seal strip further including a leading edge and a trailing edge that is spaced from the leading edge in the axial direction;
said seal strips being mounted to said stator structure with the tip portions of the seal strips at an angle with respect to the axial direction; and
each of said tip portions being formed with a continuous curvature in a radially extending plane between a leading edge and a trailing edge of each said seal strip and said curvature extending through the entire thickness of said seal strip between said forward and rearward faces of said seal strip, wherein said curvature of said tip portion of each said seal strip is defined by a reduced length of a mid-portion relative to a length of said seal strip at a location axially displaced from said mid-portion, said location being defined by at least one of said leading edge and said trailing edge of said seal strip.

2. The seal assembly of claim 1, wherein said curvature of said tip portion of each said seal strip is generally elliptical.

3. The seal assembly of claim 1, wherein said seal strips include flow inhibiting features for effecting a reduction in axial flow from an upstream high pressure region to a downstream low pressure region.

4. The seal assembly of claim 3, wherein said seal strips are angled in the axial direction with said leading edge aft of said trailing edge with reference to a rotation direction of said rotatable shaft, and said seal strips comprise a forward face and a rearward face, said flow inhibiting features comprising: said rearward face at said trailing edges of said seal strips being tapered in the axial direction for effecting an increased backpressure toward said leading edges.

5. The seal assembly of claim 3, wherein said seal strips are angled in the axial direction with said leading edge aft of said trailing edge with reference to a rotation direction of said rotatable shaft, and said seal strips comprise a forward face and a rearward face, said flow inhibiting features comprising:
a radially extending edge defining one of said leading and trailing edges of said seal strips and turned to form an angle transverse to said forward and rearward faces for effecting an increased flow pressure loss though gaps between said seal strips.

6. The seal assembly of claim 5, wherein said angle transverse to said forward and rearward faces comprises a substantially perpendicular angle extending away from said rearward face.

7. The seal assembly of claim 3, wherein said seal strips comprise forward and rearward faces, and said flow inhibiting feature comprises a rough coating applied to said forward and rearward faces for effecting an increased flow pressure loss though gaps between said seal strips.

8. The seal assembly of claim 1, wherein said seal strips are arranged in a plurality of axially adjacent rows, the seal strips of at least one of said rows being angled in the axial direction with said leading edge being located aft of said trailing edge with reference to a rotation direction of said rotatable shaft, and the seal strips of another of said rows being angled in an opposite direction with said trailing edge being located aft of said leading edge.

9. A seal assembly in a turbine engine having a housing and a rotatable shaft extending through the housing, the seal assembly being provided for effecting a seal preventing fluid flow in an axial direction through an annular space formed between the housing and the rotatable shaft, the axial direction extending parallel to a rotation axis about which said rotatable shaft rotates, the seal assembly comprising:
 a stator structure supported on the housing of the turbine engine;
 a plurality of flexible seal strips, each said seal strip comprising a planar plate extending radially through the annular space and having a radially outer end supported to said stator structure and a radially inner end comprising a tip portion extending widthwise in the axial direction for engaging in sliding contact with a peripheral surface of said rotatable shaft;
 each of said seal strips comprising a leading edge and a trailing edge, said trailing edge located axially downstream from said leading edge;
 said seal strips being mounted to said stator structure with the tip portions of the seal strips at an angle to the axial direction, defined by said leading edge of each said seal strip at said radially inner end being circumferentially displaced from said trailing edge at said radially inner end; and
 wherein said seal strips are arranged in a plurality of axially adjacent rows, the radially inner ends of the seal strips of at least one of said rows being angled in the axial direction such that said leading edge is located circumferentially aft of said trailing edge at the radially inner end with reference to a rotation direction of said rotatable shaft and effecting a directing of the fluid flow through the seal strips in a first circumferential direction, and the radially inner ends of the seal strips of another of said rows adjacent to said at least one of said rows being angled in an opposite axial direction such that said trailing edge is located circumferentially aft of said leading edge at the radially inner ends and effecting a directing of fluid flow through the seal strips in a second circumferential direction opposite from the first circumferential direction.

10. The seal assembly of claim 9, including a further axially adjacent row of said seal strips, said seal strips of said further row being angled in an opposite direction to said seal strips in the row directly adjacent to said further row.

11. The seal assembly of claim 9, wherein each of said tip portions are formed with a curvature in a radially extending plane between said leading edge and said trailing edge of each said seal strip.

12. The seal assembly of claim 9, wherein at least some of said seal strips include flow inhibiting features for effecting a reduction in axial flow from an upstream high pressure region to a downstream low pressure region.

13. The seal assembly of claim 12, wherein said seal strips comprise a forward face and a rearward face, and at least said row of said seal strips angled with said leading edge aft of said trailing edge including flow inhibiting features comprising:
 said rearward face at said trailing edges of said seal strips being tapered in the axial direction for effecting an increased backpressure toward said leading edges.

14. The seal assembly of claim 12, wherein said seal strips comprise a forward face and a rearward face, and at least said row of said seal strips angled with said leading edge aft of said trailing edge including flow inhibiting features comprising:
 a radially extending edge defining one of said leading and trailing edges of said seal strips and turned to form an angle transverse to said forward and rearward faces for effecting an increased flow pressure loss though gaps between said seal strips.

15. The seal assembly of claim 14, wherein said angle transverse to said forward and rearward faces comprises a substantially perpendicular angle extending away from said rearward face.

16. The seal assembly of claim 12, wherein said seal strips comprise forward and rearward faces, and said flow inhibiting feature comprises a rough coating applied to said forward and rearward faces for effecting an increased flow pressure loss though gaps between said seal strips.

\* \* \* \* \*